United States Patent [19]

Martin, Jr.

[11] 4,348,834
[45] Sep. 14, 1982

[54] VINE-TYPE VEGETATION ERADICATOR

[76] Inventor: Robert P. Martin, Jr., c/o Martin Sheet Metal, Inc., 7108 Madison Ave., Cleveland, Ohio 44102

[21] Appl. No.: 232,635
[22] Filed: Feb. 9, 1981
[51] Int. Cl.³ .............................................. A01G 1/00
[52] U.S. Cl. ......................................... 47/58; 47/26; 47/57.5
[58] Field of Search ....................... 47/57.5, 58, 26, 41, 47/1, 40.5, 41.11, 41 SS

[56] References Cited

U.S. PATENT DOCUMENTS

| | | | |
|---|---|---|---|
| 2,691,849 | 10/1954 | Ehlers | 47/41.11 |
| 2,784,529 | 3/1957 | Prestigiacomo | 47/57.5 |
| 2,938,304 | 5/1960 | Thomas et al. | 47/57.5 |
| 3,928,936 | 12/1975 | Wollen | 47/41 SS |

FOREIGN PATENT DOCUMENTS 53-54551  5/1978  Japan ........................ 47/26

OTHER PUBLICATIONS

McGraw-Hill Encyclopedia of Science & Technology, 1971, vol. 6, p. 477.

Primary Examiner—Robert E. Bagwill
Attorney, Agent, or Firm—Pearne, Gordon, Sessions, McCoy & Granger

[57] ABSTRACT

A method and device for eradicating vine-type vegetation by which a substantially closed container of liquid herbicide receives a stem of an unwanted plant and retains it immersed in the liquid, causing the plant to ultimately absorb a lethal dose of such herbicide.

7 Claims, 4 Drawing Figures

VINE-TYPE VEGETATION ERADICATOR

BACKGROUND OF THE INVENTION

The invention relates to weed control and, more particularly, to a process and apparatus for selective elimination of undesirable vine-type vegetation.

PRIOR ART

Herbicides are widely used to chemically control and eliminate unwanted vegetation. Most commonly, herbicides are sprayed, dusted, or otherwise spread on small plants in a given area with the intent of killing all of the foliage in the area or, with the use of a selective herbicide, to kill only particular types of plants. In many cases, herbicides are not sufficiently discriminating or controllable in their effects to avoid damage to desirable plants surrounding the objectionable ones.

In architectural gardens, cultivated shrubs, bushes, and other ornamental plants may become hosts for creeping, clinging and/or climbing weeds such as morning glory and the like. Besides being unsightly, these weeds can impair the health of and ultimately kill desired plants. Moreover, these types of weeds may be very difficult to control and eliminate because of their hardiness and because conventional chemical control can be hazardous to surrounding plants.

Hand weeding of certain vine-type weeds can involve large expenditures of time and effort because the stems of such plants tend to intertwine themselves with desired foliage, so that great care must be exercised in removing these stems and associated shoots without breaking the stem, limbs, flowers, leaves, etc. of the wanted plants. Moreover, certain vine-type weeds have a root structure which is particularly difficult, if not impossible, to remove by pulling up exposed stalks because the latter break off before the roots are disturbed. Any remaining buried root structure often has sufficient vitality to send up new shoots even after several weeding attempts. Hand weeding of vine-type weeds is especially difficult in architectural gardens or like places, where the weeds are rooted in areas planted in ground cover. In these circumstances, the vine cannot be simply pulled up without risk of harm to the ground covering, and cannot be readily visually or physically traced to a root system.

SUMMARY OF THE INVENTION

The invention provides a method and device for the selective chemical elimination of undesirable vine-type vegetation. According to this invention, a stem of an objectionable vine or similar vegetation is inserted into a vial containing a liquid herbicide. Means for retaining a length of the stem immersed in the herbicide is provided adjacent a neck opening of the vial. The vial remains attached by this retention means for an indefinite time, during which the herbicide is absorbed into the stem and ultimately into the vital parts of the plant. Preferably, the retaining means has sufficient stem gripping capacity to enable the vial and its contents to be suspended by the stem, thereby permitting the vial to be positioned wherever an offending plant stem is conveniently reached. Any gap between the neck opening and vine stem ideally is sufficiently sealed to prevent significant evaporation of the liquid herbicide throughout the period required for the unwanted plant to perish.

The disclosed method and apparatus of weed control is particularly effective since it is not directly impaired by rain, dew, water, sprinkling, wind, and the like, as are other known chemical plant control techniques. The inventive technique, as indicated above, is characterized by the feature of continuous direct supply of herbicide to the plant as long as the latter is capable of liquid absorption. An extremely wide variety of herbicides may be employed in the practice of the invention so that results for substantially any application may be maximized. With the invention, the risk of accidental poisoning of cultivated plants is essentially eliminated.

DESCRIPTION OF THE PREFERRED EMBODIMENT

Figure 1:
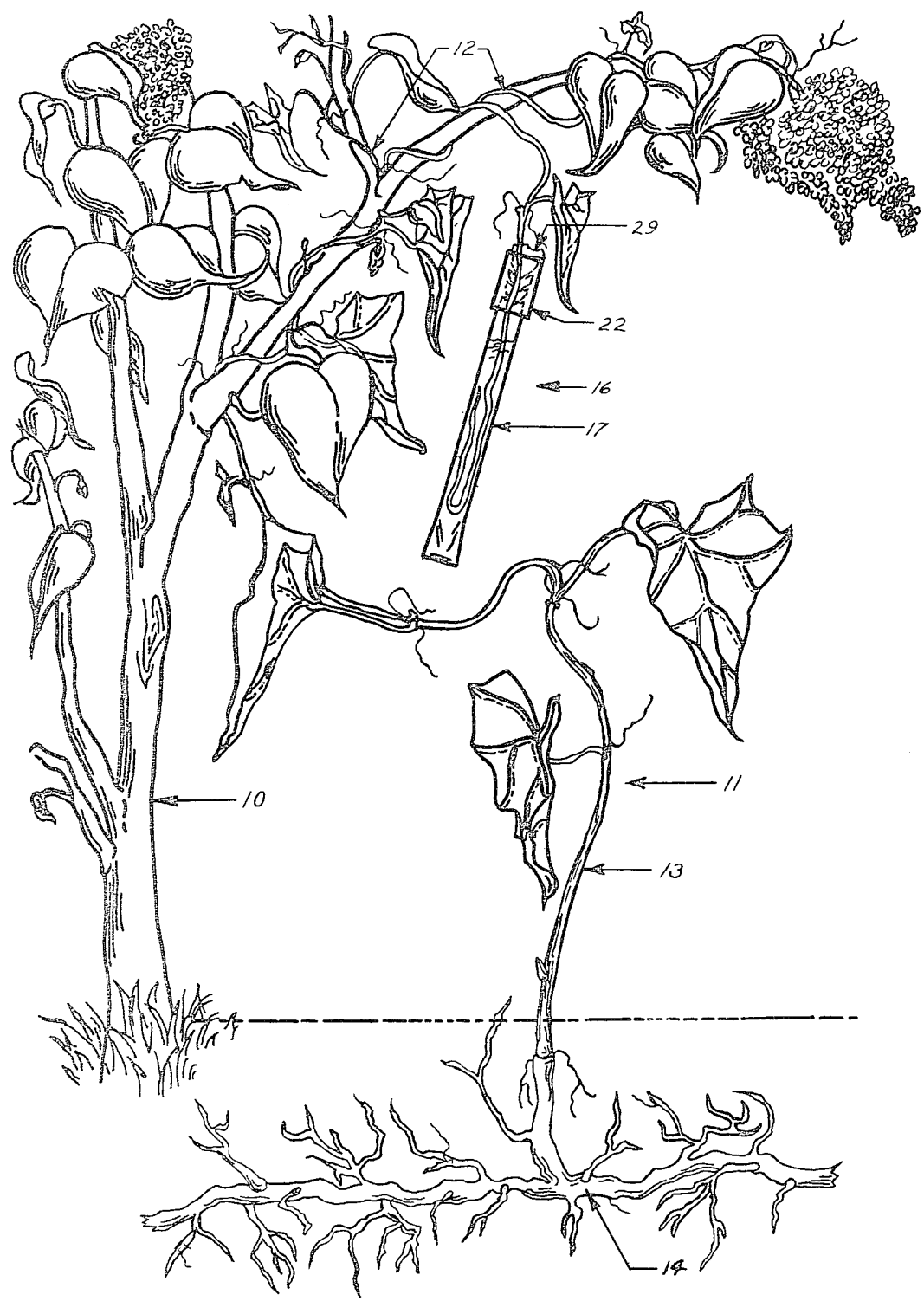
FIG. 1 is a schematic view of an objectionable vine entwined on a cultivated plant, and being treated by a herbicidal device embodying the invention.
Figures 2, 3:
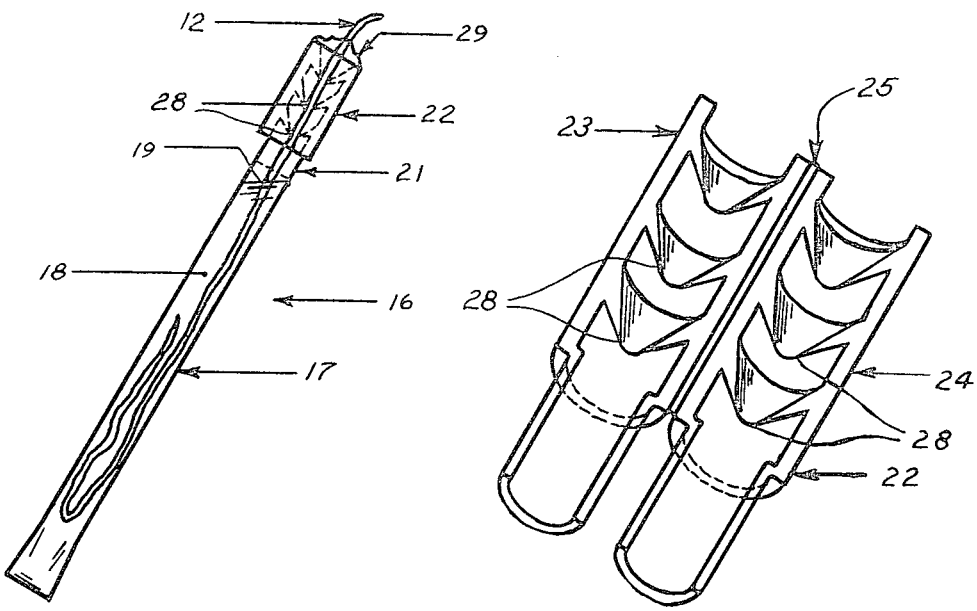
FIG. 2 is a perspective view of the herbicidal device of FIG. 1, illustrated on a somewhat enlarged scale.
FIG. 3 is a perspective view of a neck-forming and stem-retaining means of the herbicidal device.
Figure 4:
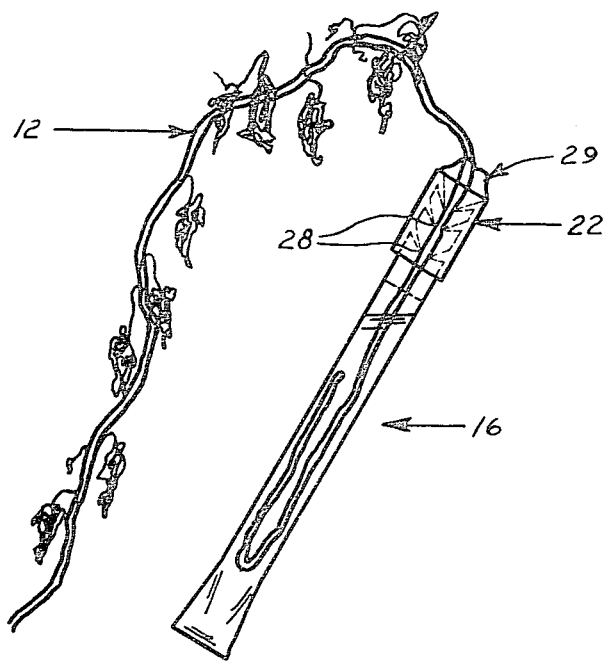
FIG. 4 is a schematic partial view of the vine of FIG. 1 following a period of emplacement of the herbicidal device.

Referring now to FIG. 1, a stalk or trunk 10 of a cultivated plant is being overgrown by a vine 11 or like plant, such as morning glory. Stems 12 of the vine 11 are intertwined with the limbs of the cultivated plant, making it difficult to separate one plant from the other when an attempt is made to manually weed the vine 11. In the illustrated case, the vine 11 is nourished through its main stalk 13 by a relatively large root stalk 14. It is recognized that such root stalks 14 and like root structures are nearly impossible even in only moderately compacted soil to successfully uproot by pulling on the main stalk 13. Usually, the main stalk 13 will tear loose from the root structure 14 and the root structure will have enough vitality to send up new shoots and thereby renew the plant 11.

The weed or vine 11 can be successively destroyed without danger to the cultivated plant 10 by attaching to the vine 11 a herbicidal device 16 in accordance with the present invention. In the illustrated form, the device 16 includes an elongated, liquidtight vial 17 in which is contained a liquid herbicide 18. The vial 17 may be transparent or translucent, and then will show the level of the herbicide at 19. One way of fabricating the vial 17 involves the extrusion of a suitabale plastic material into a tube similar to that of a drinking straw, i.e., an inside diameter of approximately one-quarter inch and a relatively thin wall. Where, as illustrated, the vial construction material is a thermoplastic, the lower end of the vial tube 17 can be flattened and heat-sealed to close it off in a liquidtight manner.

At an open neck 21 of the vial 17, a stem retainer 22 is adapted to mechanically grip a vine stem 12 and hold it in the vial 17. In the illustrated case, the retainer 22 is formed separately from the vial 17. The retainer 22 is, for example, fabricated as an injection-molded plastic part in the form of an axially split plug, with its halves 23, 24 joined by an integral living hinge 25. The inner faces of the retaining halves 23, 24 are provided with arcuate, somewhat resilient stem gripping barbs 28 which are inclined radially and axially inwardly towards the center of the vial 17. The barbs 28 are somewhat resilient to comply with the size of a particular stem 12 when the opposed retainer halves 23, 24 are clasped about it and are pushed into the neck 21 of the vial 17. Lower portions 29 of the retainer halves 23, 24 fit tightly into the interior of the vial 17.

A stem 12 of the unwanted vine 11 is preferably inserted substantially to the full depth of the vial 17. In the illustrated case, the stem 12 is folded over or broken over itself to reduce the risk that it will put out of the retainer 22. The end of the stem 12 inserted in the vial 17 may be a natural end or one formed by cutting into a midlength of a stem in convenient reach of the person installing the vial 17. The retainer plug 22 can be inserted in the open neck 21 of the vial 17 before or after the stem is inserted in the vial. To reduce or eliminate evaporation and leakage of the herbicide liquid from the vial 17, the gap between the stem 12 and elements of the retainer 22 in the neck of the vial may be sealed by means of a natural or synthetic, pliable wax, putty, or like sealant 29. The barbs 28/sealant 29 combination thereof preferably has sufficient stem retaining capacity to carry the weight of the vial 17 and its contents as shown in FIG. 1.

The liquid herbicide may be a commercially available type, such as Kleenup Systemic Weed and Grass Killer or Contax Weed and Grass Killer, both marketed by Ortho Consumer Product Division of Chevron Chemical Company. In these products and other herbicides to be used, the toxic substance is either a liquid itself or is soluble or dispersible, or otherwise carried in a liquid phase. Further, the toxicant is preferably of the translocatable type, wherein it moves within the plant to which the vial 17 is attached. It is contemplated that the vial 17 can be filled with a liquid herbicide by the manufacturer of the herbicidal device 16 and be suitably sealed until use. Alternatively, the vial can be charged with dry constituents of a soluble herbicide and later liquefied with water or other suitable solvent by the ultimate user. Another way of achieving the desired result of contacting the stem 12 with absorbable herbicide, but to reduce the tendency of the herbicide to spill and evaporate, is to provide the herbicide in a thick liquid of pastelike consistency.

The liquid herbicide 18 is absorbed by the stem 12 through its external surfaces, and it passes eventually to the root 14 of the vine and may further pass to other stems through such root. The absorption mechanism exists as long as the stem 12 is viable, making the disclosed technique exceptionally effective. Operation of the liquid herbicide 18, since it is effectively sealed from the atmosphere, is unaffected by such environmental conditions as rain, dew, water, sprinkling, and wind. This sealing of the vial provided by the material 29 also ensures against contamination of the desirable plant 10 which could otherwise occur where rain or other surface water flooded the vial 17 and carried its contents off into the surrounding soil and ultimately to a cultivated plant.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited. It is contemplated that the function of the retaining means 22 and sealant 29 can be combined and replaced, for example, with a suitable adhesive tape applied over both the exterior of the vial neck 21 and the adjacent portion of the stem 12.

What is claimed is:

1. A device for eradicating vine-type vegetation comprising a liquidtight, substantially closed container having an interior for holding a liquid herbicide and receiving the natural or cut end of the stem or stalk of undesirable vegetation, a herbicide in the container, the container having an open neck leading to the interior of the container for receiving the stem end, and means adjacent the neck to retain the stem immersed in a liquid herbicide contained in said interior.

2. A device as set forth in claim 1, wherein said stem retaining means has sufficient strength to support the weight of said container on said stem or stalk.

3. A device as set forth in claim 2, wherein said retaining means is at least partially disposed within said neck.

4. A device as set forth in claim 2, wherein said retaining means includes mechanical gripping elements adapted to clamp said stem therebetween.

5. A device as set forth in claim 1, including sealing means at a gap between said stem and said open neck to reduce evaporation of said liquid herbicide.

6. A method of eradicating unwanted vegetation, comprising the steps of providing a liquidtight, substantially closed container with a neck opening to its interior, introducing liquid herbicide into the container, inserting a natural or cut end of a stem or stalk of an undesired plant into the container and immersing it in the liquid herbicide, then leaving the stem or stalk immersed in the liquid herbicide until the plant has absorbed sufficient herbicide to destroy it as indicated by visually apparent degeneration of the plant, the gap between the stem or stalk of the plant and the neck opening of the container being substantially sealed to prevent evaporation of the liquid herbicide.

7. A method as set forth in claim 6, wherein the container is attached to the stem or stalk with retention means sufficient to support the weight of the container.

* * * * *